US012749437B2

(12) United States Patent
Guo et al.

(10) Patent No.: US 12,749,437 B2
(45) Date of Patent: Sep. 29, 2026

(54) PIXEL CIRCUIT WITH SEPARATED THRESHOLD VOLTAGE COMPENSATION AND DATA WRITE PHASES AND DRIVING METHOD THEREFOR, AND DISPLAY PANEL

(71) Applicant: KunShan Go-Visionox Opto-Electronics Co., Ltd, Kunshan (CN)

(72) Inventors: Enqing Guo, Kunshan (CN); Junfeng Li, Kunshan (CN); Cuili Gai, Kunshan (CN); Rubo Xing, Kunshan (CN)

(73) Assignee: KunShan Go-Visionox Opto-Electronics Co., Ltd, Kunshan (CN)

( * ) Notice: Subject to any disclaimer, the term of this patent is extended or adjusted under 35 U.S.C. 154(b) by 0 days.

(21) Appl. No.: 19/084,803

(22) Filed: Mar. 20, 2025

(65) Prior Publication Data

US 2025/0218356 A1 Jul. 3, 2025

Related U.S. Application Data

(63) Continuation of application No. PCT/CN2022/139215, filed on Dec. 15, 2022.

(30) Foreign Application Priority Data

Sep. 23, 2022 (CN) ......................... 202211161648.8

(51) Int. Cl.
*G09G 3/32* (2016.01)

(52) U.S. Cl.
CPC ......... *G09G 3/32* (2013.01); *G09G 2300/043* (2013.01); *G09G 2300/0852* (2013.01);
(Continued)

(58) Field of Classification Search
None
See application file for complete search history.

(56) References Cited

U.S. PATENT DOCUMENTS

2004/0070557 A1 4/2004 Asano et al.
2016/0203761 A1 7/2016 Zhang
(Continued)

FOREIGN PATENT DOCUMENTS

CN 110010072 A 7/2019
CN 111445858 A 7/2020
(Continued)

OTHER PUBLICATIONS

International Search Report of Application No. PCT/CN2022/139215.
(Continued)

*Primary Examiner* — Donna V Bocar
(74) *Attorney, Agent, or Firm* — Kilpatrick Townsend & Stockton LLP

(57) ABSTRACT

Provided are a pixel circuit, a method of driving the same, and a display panel. The pixel circuit includes a drive module, a storage module, a coupling module, a first reset module, a second reset module, a discharge module, a data write module, and a light emission control module. The storage module is electrically connected to the control terminal of the drive module and the first terminal of the drive module. The first terminal of the coupling module is electrically connected to the first terminal of the drive module. The first reset module is electrically connected to the second terminal of the coupling module. The second reset module is electrically connected to the control terminal of the drive module. The discharge module is electrically connected to the second terminal of the drive module.

9 Claims, 11 Drawing Sheets

(52) U.S. Cl.
CPC ... *G09G 2310/061* (2013.01); *G09G 2310/08* (2013.01); *G09G 2320/0233* (2013.01)

(56) References Cited

U.S. PATENT DOCUMENTS

| | | | | |
|---|---|---|---|---|
| 2018/0090071 | A1* | 3/2018 | Ma | G09G 3/3233 |
| 2021/0166623 | A1 | 6/2021 | Gai et al. | |
| 2021/0358405 | A1 | 11/2021 | Yang et al. | |
| 2021/0366386 | A1* | 11/2021 | Gao | G09G 3/3258 |

FOREIGN PATENT DOCUMENTS

| | | | |
|---|---|---|---|
| CN | 111583870 | A | 8/2020 |
| CN | 111696473 | A | 9/2020 |
| CN | 111710298 | A | 9/2020 |
| CN | 112820242 | A | 5/2021 |
| CN | 112908258 | A | 6/2021 |
| CN | 113299230 | A | 8/2021 |
| CN | 113539184 | A | 10/2021 |
| CN | 113870758 | A | 12/2021 |
| CN | 114495822 | A | 5/2022 |
| CN | 114708838 | A | 7/2022 |
| CN | 114724508 | A | 7/2022 |
| CN | 115240582 | A | 10/2022 |
| JP | 2004286816 | A | 10/2004 |
| KR | 20190022446 | A | 3/2019 |

OTHER PUBLICATIONS

First Office Action of Application No. Cn 202211161648.8.
Notice of Registration of Application No. Cn 202211161648.8.
Korean Patent Office, Notice of Allowance issued in Korean Patent Application No. 10-2025-7011186 dated Dec. 14, 2025.

* cited by examiner

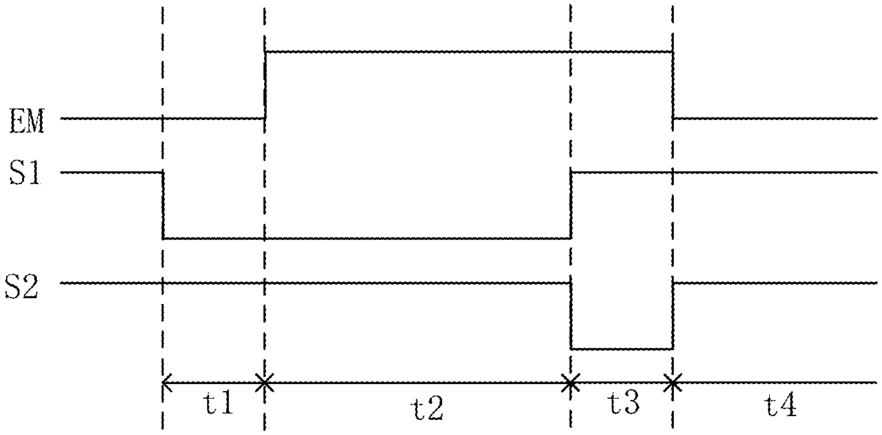

FIG. 12

In a reset phase, control the first reset module to transmit the first reset signal to the second terminal of the coupling module, control the second reset module to transmit the second reset signal to the control terminal of the drive module, control the discharge module to transmit the second reset signal to the second terminal of the drive module, and control the light emission control module to transmit a first power signal provided by the first power supply to the first terminal of the drive module and transmit the second reset signal to the first electrode of the light-emitting element — S110

↓

In the threshold compensation phase, control the first reset module to transmit the first reset signal to the second terminal of the coupling module; control the second reset module to transmit the second reset signal to the control terminal of the drive module; and control the discharge module to turn on to make the first terminal of the drive module discharge through the drive module and the discharge module to make the storage module store the threshold voltage of the drive module until the drive module is turned off when a potential difference between the control terminal of the drive module and the first terminal of the drive module is equal to the threshold voltage of the drive module — S120

↓

In the data write phase, control the second reset module to transmit the second reset signal to the control terminal of the drive module, control the data write module to write the data voltage to the second terminal of the coupling module, and control the coupling module to couple the potential variation at the second terminal of the coupling module to the first terminal of the coupling module — S130

↓

In a light emission phase, control the light emission control module to turn on, make the drive module generate a drive current based on a voltage at the control terminal of the drive module and a voltage at the first terminal of the drive module, and transmit the drive current to the light-emitting element — S140

FIG. 13

PIXEL CIRCUIT WITH SEPARATED THRESHOLD VOLTAGE COMPENSATION AND DATA WRITE PHASES AND DRIVING METHOD THEREFOR, AND DISPLAY PANEL

CROSS-REFERENCE TO RELATED APPLICATIONS

This application is a continuation of International Patent Application No. PCT/CN2022/139215, filed on Dec. 15, 2022, which claims priority to Chinese Patent Application No. 202211161648.8 filed on Sep. 23, 2022, disclosures of both of which are incorporated herein by reference in their entireties.

FIELD

The present application relates to the field of display technology, for example, a pixel circuit, a method of driving the same, and a display panel.

BACKGROUND

With the continuous development of display technology, display panels are increasingly widely used, and people's requirements for display panels are getting higher and higher. The pixel circuit of a display panel plays a very important role in driving stable light emission of light-emitting elements of the display panel. However, in the driving process of a pixel circuit of the related art, data write and threshold voltage compensation are the same process, so the compensation duration of a drive transistor is insufficient. For example, if the row duration is short at a high refresh rate, insufficient compensation duration causes a poor compensation effect for the threshold voltage of the drive transistor. Moreover, the pixel circuit of the related art has different threshold voltage compensation degrees at multiple grayscales. As a result, a display panel of the related art faces the problems of nonuniform brightness, limited resolution, and limited refresh rate.

SUMMARY

The present application provides a pixel circuit, a method of driving the same, and a display panel.

Embodiments of the present application provide the following solutions:

A pixel circuit includes a drive module, a storage module, a coupling module, a first reset module, a second reset module, a discharge module, a data write module, and a light emission control module. The storage module is electrically connected to the control terminal of the drive module and the first terminal of the drive module and configured to store the potential difference between the control terminal of the drive module and the first terminal of the drive module. The first terminal of the coupling module is electrically connected to the first terminal of the drive module. The coupling module is configured to couple the potential variation at the second terminal of the coupling module to the first terminal of the coupling module. The first reset module is electrically connected to the second terminal of the coupling module and configured to transmit a first reset signal to the second terminal of the coupling module to reset the second terminal of the coupling module before a data write phase. The second reset module is electrically connected to the control terminal of the drive module and configured to transmit a second reset signal to the control terminal of the drive module in at least a threshold compensation phase and the data write phase. The discharge module is electrically connected to the second terminal of the drive module and drives, by configured to be turned on in the threshold compensation phase, the first terminal of the drive module discharge through the drive module and the discharge module to store a threshold voltage of the drive module in the storage module. The data write module is electrically connected to the second terminal of the coupling module and configured to receive a data voltage. The light emission control module is connected to the drive module and a light-emitting element between a first power supply and a second power supply.

BRIEF DESCRIPTION OF DRAWINGS

FIG. 12 is a drive timing diagram of another pixel circuit according to embodiments of the present application.

FIG. 13 is a flowchart of a method of driving a pixel circuit according to embodiments of the present application.

DETAILED DESCRIPTION

It is to be noted that the terms "first", "second" and the like in the description, claims and drawings of the present application are used to distinguish between similar objects and are not necessarily used to describe a particular order or sequence. It is to be understood that data used in this manner is interchangeable in appropriate cases and the embodiments of the present application described herein can also be implemented in an order not illustrated or described herein. In addition, the term "include", "have", or any other variation thereof is intended to encompass a non-exclusive inclusion.

Figure 1:
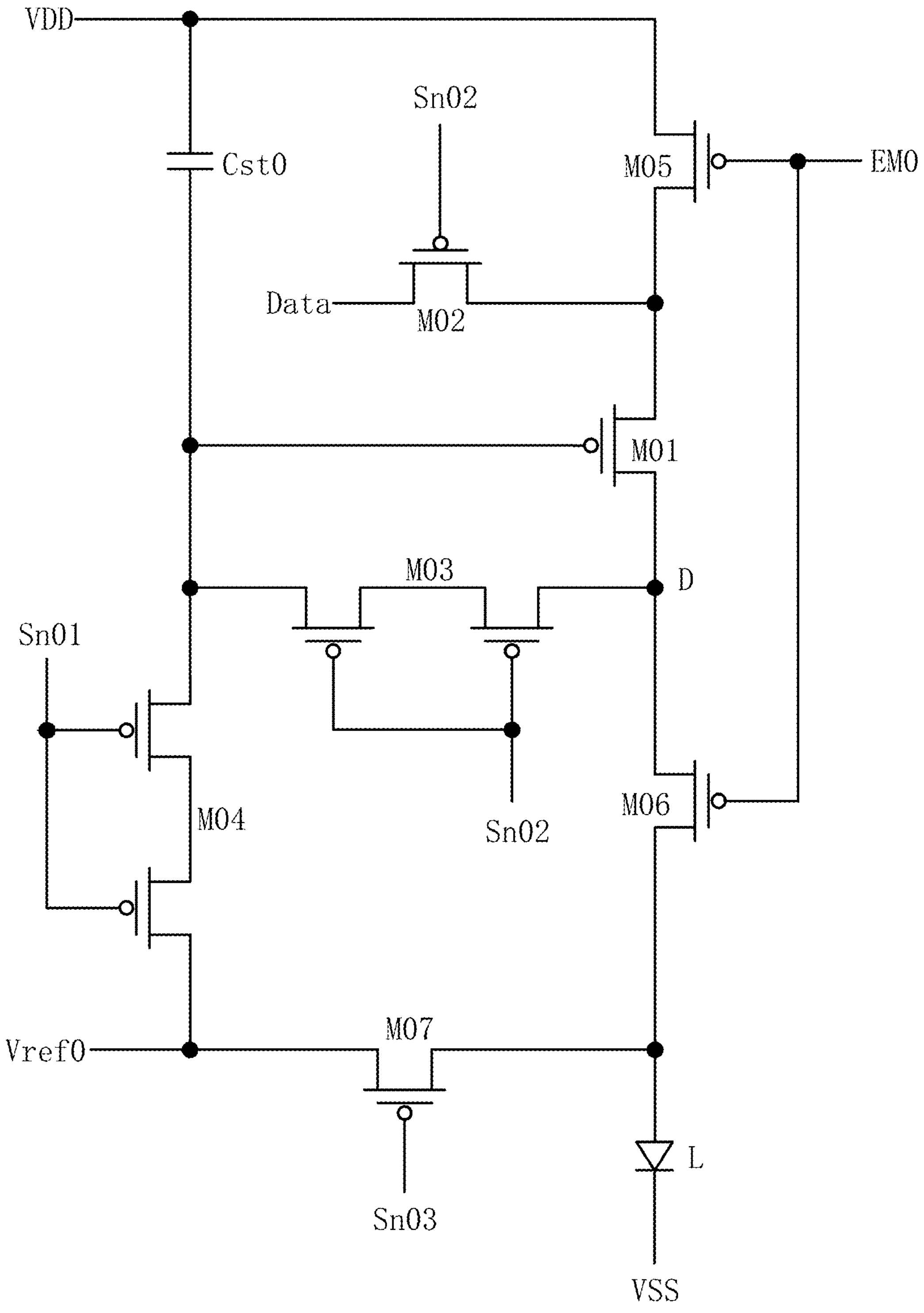
FIG. 1 is a diagram illustrating the structure of a pixel circuit.

As described in the background, in the driving process of the pixel circuit of the related art, data write and threshold voltage compensation are performed in the same phase. As a result, the display panel of the related art faces the problems of nonuniform brightness, limited resolution, and limited refresh rate. Referring to FIG. 1, the following describes why the preceding situation occurs: FIG. 1 shows a 7T1C pixel circuit of the related art. Referring to FIG. 1, the pixel circuit includes a transistor M01, a transistor M02, a transistor M03, a transistor M04, a transistor M05, a transistor M06, a transistor M07, and a storage capacitor Cst0. Illustratively, the transistors are each a p-type transistor prepared by using a low-temperature polycrystalline silicon (LTPS) technique. Signals required to be input to the pixel circuit include a first power signal VDD, a second power signal VSS, a reset signal Vref0, a data signal Data, a scan signal Sn01, a scan signal Sn02, a scan signal Sn03, and a light emission control signal EMO. The driving process of the pixel circuit includes a reset phase, a data write and compensation phase, and a light emission phase. The following describes the data write and compensation phase of the pixel circuit.

In the pixel circuit, the transistor M01 is a drive transistor, the gate potential of the transistor M01 is stored in the storage capacitor Cst0, the transistor M02 serves as a data write transistor, the transistor M03 serves as a threshold compensation transistor, and the gate of the transistor M02 and the gate of the transistor M03 are each configured to receive a scan signal Sn02. In the data write and compensation phase, the scan signal Sn02 is at a low potential, the transistor M02 and the transistor M03 are both on, the data signal Data is transmitted to the gate of the transistor M01 after passing through the transistor M02, the first and second electrodes of the transistor M01, and the transistor M03, and the storage capacitor Cst0 is charged. This process is aimed to correctly store information including the data signal Data and the threshold voltage Vth of the transistor M01 by using the storage capacitor Cst0. In this process, waiting is required until the gate of the transistor M01 is turned off when being charged to Data+Vth. This limits the speed of data write of the pixel circuit. If the row duration (the maintenance duration of data signals provided for one row of pixel circuit by the driver chip) is relatively short, the gate potential of the transistor M01 cannot reach Data+Vth, so the data write and compensation phase ends prematurely, causing a poor compensation effect. In addition, a potential difference of the data signal Data at different grayscales may cause a compensation difference of the transistor M01 at different grayscales. That is, the threshold voltage compensation effect of the pixel circuit of the related art is affected by the data write duration and the magnitude of the potential (grayscale level) of the data signal Data. Insufficient compensation duration causes a poor compensation effect. In another embodiment, to ensure the threshold compensation effect, the data write duration requires to be set long, so the refresh rate of the display panel is limited. In the case of limited refresh rate, even if the layout and preparation technology of the pixel circuit can satisfy the high resolution requirement, the resolution is limited because the driving process does not satisfy the requirement.

Figure 2:
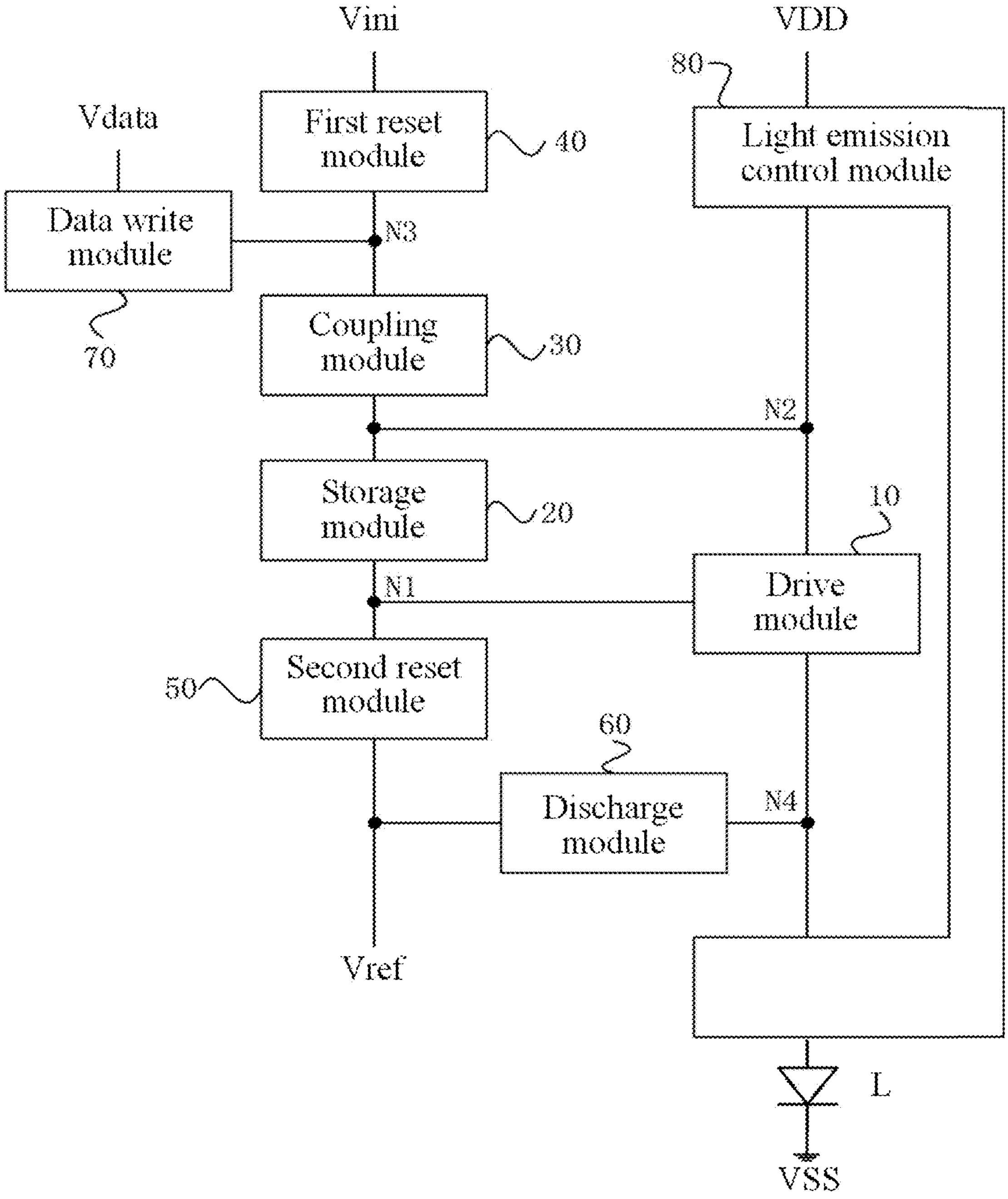
FIG. 2 is a diagram illustrating the structure of a pixel circuit according to embodiments of the present application.

Embodiments of the present application provide a new pixel circuit. FIG. 2 is a diagram illustrating the structure of a pixel circuit according to embodiments of the present application. Referring to FIG. 2, the pixel circuit includes a drive module 10, a storage module 20, a coupling module 30, a first reset module 40, a second reset module 50, a discharge module 60, a data write module 70, and a light emission control module 80.

The drive module 10 is configured to generate a drive current based on the voltage at the control terminal N1 of the drive module 10 and the voltage at the first terminal N2 of the drive module 10. The storage module 20 is electrically connected to the control terminal N1 and the first terminal N2 of the drive module 10 and configured to store the potential difference between the control terminal N1 of the drive module 10 and the first terminal N2 of the drive module 10. The first terminal of the coupling module 30 is electrically connected to the first terminal N2 of the drive module 10. The coupling module 30 is configured to couple the potential variation at the second terminal N3 of the coupling module 30 to the first terminal of the coupling module 30. The first reset module 40 is electrically connected to the second terminal N3 of the coupling module 30. The first reset module 40 is configured to transmit a first reset signal Vini to the second terminal N3 of the coupling module 30 to reset the second terminal N3 of the coupling module 30. The second reset module 50 is electrically connected to the control terminal N1 of the drive module 10. The second reset module 50 is configured to transmit a second reset signal Vref to the control terminal N1 of the drive module 10. The discharge module 60 is electrically connected to the second terminal N4 of the drive module 10. The discharge module 60 is configured to be turned on a signal transmission path between the drive module 10 and a second reset signal line (that is, a signal line configured to transmit the second reset signal Vref) to transmit the second reset signal Vref to the second terminal N4 of the drive module 10, or the discharge module 60 is configured to be turned on in the threshold compensation phase to make the first terminal N2 of the drive module 10 discharge through the drive module 10 and the discharge module 60 to make the storage module 20 store the threshold voltage of the drive module 10. The data write module 70 is electrically connected to the second terminal N3 of the coupling module 30. The data write module 70 is configured to write the data voltage Vdata to the second terminal N3 of the coupling module 30. The light emission control module 80 is connected to the drive module 10 and the light-emitting element L between a first power supply and a second power supply. The light emission control module 80 is configured to control the drive module 10 to connect to the first power supply and the second power supply.

Illustratively, the drive module 10 includes a drive transistor. The threshold voltage of the drive transistor is the threshold voltage of the drive module 10. The first electrode of the light-emitting element L is an anode. The second electrode of the light-emitting element L is a cathode. The first power supply is configured to generate the first power signal VDD. The second power supply is configured to generate the second power signal VSS. The first power signal VDD, the second power signal VSS, the first reset signal Vini, and the second reset signal Vref are each a DC voltage signal and may be provided by a power chip or a driver chip in the display panel. The first power signal VDD may be a positive voltage signal. The second power signal VSS may be a negative voltage signal.

Illustratively, the driving process of the pixel circuit includes a reset phase, a threshold compensation phase, a data write phase, and a light emission phase. The following describes the action process of multiple function modules in multiple phases: For example, the driving process of the pixel circuit includes a reset phase, a threshold compensation phase, a data write phase, and a light emission phase.

In the reset phase, the first reset module 40 transmits the first reset signal Vini to the second terminal N3 of the coupling module 30 to reset the second terminal N3 of the coupling module 30; the second reset module 50 transmits the second reset signal Vref to the control terminal N1 of the drive module 10 to reset the control terminal N1 of the drive module 10; the discharge module 60 transmits the second reset signal Vref to the second terminal N4 of the drive module 10 to reset the second terminal N4 of the drive module 10; and the light emission control module 80 transmits the first power signal VDD to the first terminal N2 of the drive module 10 and continues to transmit the second reset signal Vref transmitted to the second terminal N4 of the drive module 10 to the first electrode of the light-emitting element L to reset the first electrode of the light-emitting element L.

In the threshold compensation phase, the first reset module 40 transmits the first reset signal Vini to the second terminal N3 of the coupling module 30 and keeps the potential at the second terminal N3 of the coupling module 30 unchanged; the second reset module 50 transmits the second reset signal Vref to the control terminal N1 of the drive module 10 and keeps the potential at the control terminal N1 of the drive module 10 unchanged; and the discharge module 60 is turned on to make the first terminal N2 of the drive module 10 discharge through the drive module 10 and the discharge module 60 to make storage module 20 store the threshold voltage Vth1 of the drive module 10 until the drive module 10 is turned off when the potential difference between the control terminal N1 of the drive module 10 and the first terminal N2 of the drive module 10 is equal to the threshold voltage Vth1 of the drive module 10, that is, the potential at the first terminal N2 of the drive module 10 is equal to Vref−Vth1. In this phase, the potential at the control terminal N1 of the drive module 10 remains unchanged under the second reset signal Vref, and a threshold compensation process is implemented by discharging of the first terminal N2 of the drive module 10. The degree of threshold compensation is controlled by only the second reset signal Vref and the potential (that is, the first power signal VDD) of the first terminal N2 of the drive module 10 at the initial moment of this phase and is independent of the data voltage Vdata and threshold compensation effects of the drive module 10 at multiple grayscales can be unified, the display uniformity can be improved, and the threshold voltage Vth1 that is positive can be compensated for.

In the data write phase, the second reset module 50 transmits the second reset signal Vref to the control terminal N1 of the drive module 10 and keeps the potential at the control terminal N1 of the drive module 10 unchanged; the data write module 70 writes the data voltage Vdata to the second terminal N3 of the coupling module 30; and the coupling module 30 couples the potential variation at the second terminal N3 of the coupling module 30 to the first terminal of the coupling module 30 (that is, the first terminal N2 of the drive module 10), that is, couple the potential that carries data voltage Vdata information (for example, the difference information between the data voltage Vdata and the first reset signal Vini) to the first terminal N2 of the drive module 10. Because the storage module 20 in the previous phase has stored the threshold voltage Vth1 of the drive module 10, in conjunction with the potential jump at the first terminal N2 of the drive module 10 in this phase, the potential difference between the two terminals of the storage module 20 in this phase carries both information about the threshold voltage Vth1 and information about the data voltage Vdata.

In the light emission phase, the light emission control module 80 is turned on, the signal transmission path of first power supply-drive module 10-light-emitting element L is turned on, the drive module 10 generates a drive current based on the voltage at the control terminal N1 of the drive module 10 and the voltage at the first terminal N2 of the drive module 10, and the drive current drives the light-emitting element L to emit light. In this phase, the drive current generated by the drive module 10 is a function of Vgs−Vth1, where Vgs denotes the potential difference between the control terminal N1 of the drive module 10 and the first terminal N2 of the drive module 10, that is, the potential difference between the two terminals of the storage module 20. Because Vgs carries information about the threshold voltage Vth1, after the preceding subtraction operation, the impact of the threshold voltage Vth1 on the drive current can be eliminated, and the threshold compensation effect can be achieved.

In the pixel circuit of this embodiment of the present application, the threshold compensation phase is configured to be separated from the data write phase and the threshold compensation duration can be lengthened without being limited by the data write row duration and thus a better compensation effect can be achieved. In addition, the threshold compensation process of the drive module 10 is controlled by only the second reset signal Vref and the first power signal VDD and is independent of the magnitude of the data voltage Vdata. An overlap between threshold compensation phases of pixel circuits in different rows does not affect the data write effect. Therefore, an increase in the threshold compensation duration does not affect the refresh rate of the display panel. In addition, in this embodiment, data write is implemented by potential jump provided for the second terminal N3 of the coupling module 30, so the value of the data voltage Vdata at the end of the data write phase determines the data voltage finally written to the pixel circuit. Correct write of data voltages in multiple rows can be ensured as long as data write phases of pixel circuits in different rows end at different times. That is, this embodiment allows an overlap between data write durations of different rows. This ensures high resolution and high refresh rate of the display panel. In addition, the threshold compensation process of the drive module 10 is independent of the magnitude of the data voltage Vdata, so biasing of the drive module 10 is not affected by a grayscale change. The threshold compensation effect of the drive module 10 basically remains the same regardless of the grayscale level and the magnitude of the data voltage Vdata, thereby reducing the compensation difference between different grayscales and ensuring more uniform display. Therefore, compared with the related art, embodiments of the present application can ensure more uniform brightness, high resolution, and high refresh rate of the display panel.

Based on the previous embodiments, for example, the first reset module 40, the second reset module 50, the discharge module 60, the data write module 70, and the light emission control module 80 all perform module on/off control based on their respective received control signals, the following describes the connection mode and control process of multiple control signals in the pixel circuit.

Figure 3:
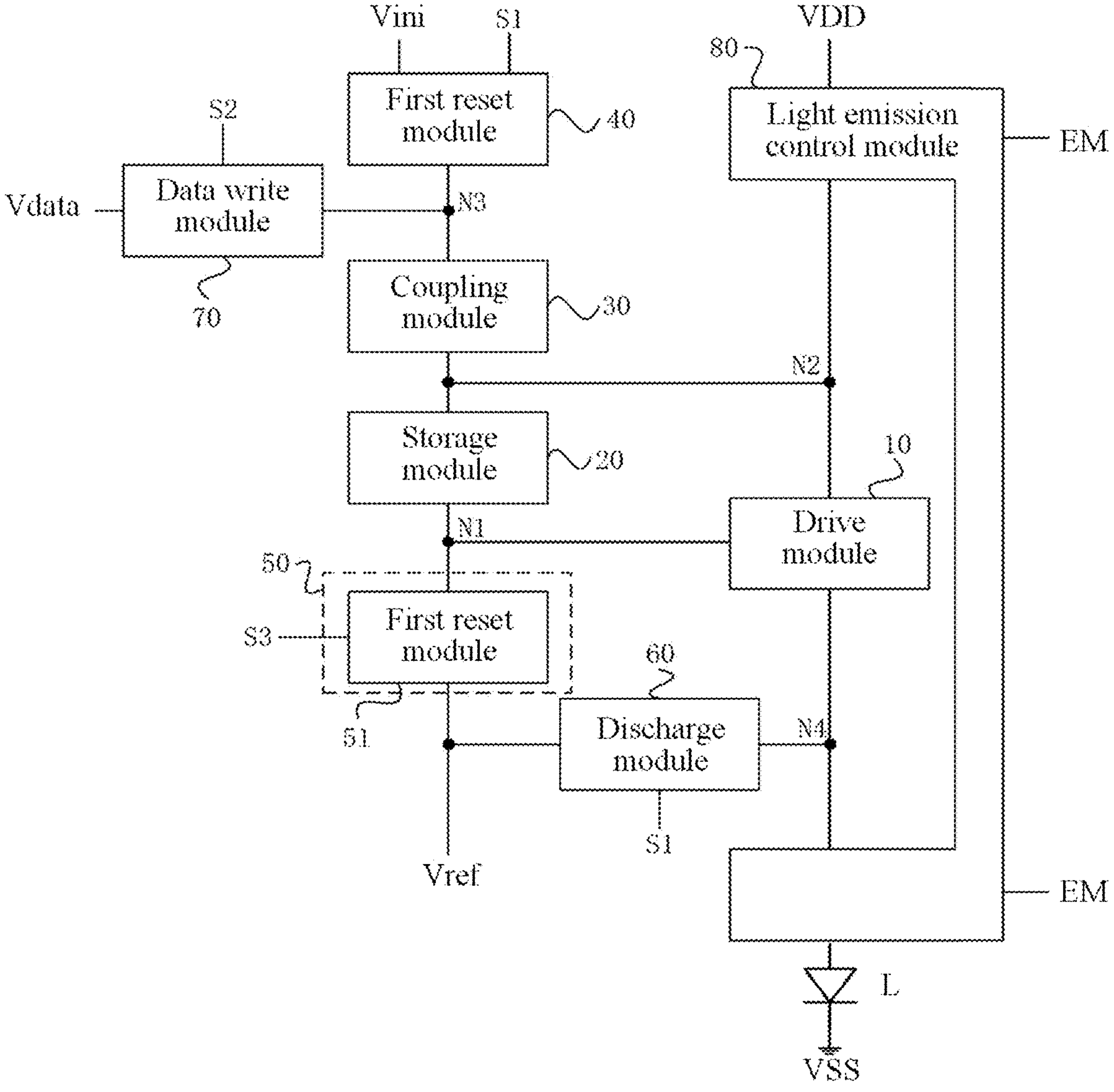
FIG. 3 is a diagram illustrating the structure of another pixel circuit according to embodiments of the present application.
Figure 4:
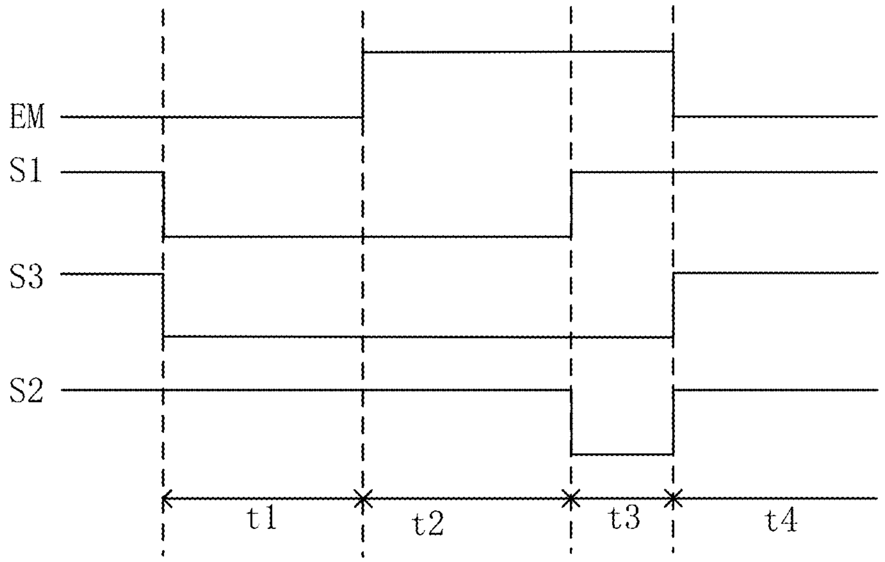
FIG. 4 is a drive timing diagram of a pixel circuit according to embodiments of the present application.

FIG. 3 is a diagram illustrating the structure of another pixel circuit according to embodiments of the present application. FIG. 4 is a drive timing diagram of a pixel circuit according to embodiments of the present application. Referring to FIGS. 3 and 4, in an example in which multiple function modules all turn on in response to a control signal at a low potential, the control terminal of the first reset module 40 is configured to receive a first control signal S1, and the first reset module 40 is configured to, in response to the first control signal S1, be turned on in the reset phase t1 and the threshold compensation phase t2 to transmit the first reset signal Vini to the second terminal N3 of the coupling module 30. The second reset module 50 includes a first reset unit 51. The first reset unit 51 is electrically connected to the control terminal N1 of the drive module 10 and configured to receive a third control signal S3. The first reset unit 51 is configured to, in response to the third control signal S3, be turned on in the reset phase t1, the threshold compensation phase t2, and the data write phase t3 to transmit the second reset signal Vref to the control terminal N1 of the drive module 10. The control terminal of the discharge module 60 is configured to receive the first control signal S1. The discharge module 60 is configured to, in response to the first control signal S1, be turned on in the reset phase t1 and transmit the second reset signal Vref to the second terminal N4 of the drive module 10 in the reset phase t1; and turn on in the threshold compensation phase t2 to make the first terminal N2 of the drive module 10 discharge through the drive module 10 and the discharge module 60. The control terminal of the data write module 70 is configured to receive a second control signal S2. The data write module 70 is configured to, in response to the second control signal S2, be turned in the data write phase t3 to write the data voltage Vdata to the second terminal N3 of the coupling module 30 in the data write phase t3. The control terminal of the light emission control module 80 is configured to receive the light emission control signal EM. The light emission control module 80 is configured to, in response to the light emission control signal EM, be turned in the reset phase t1 to reset the first terminal N2 of the drive module 10 and the first electrode of the light-emitting element L, and be turned turn on in the light emission phase t4 to provide a transmission path of the drive current to the light-emitting element L to make the drive current to drive the light-emitting element L to emit light in the light emission phase t4.

Illustratively, the first control signal S1, the second control signal S2, the third control signal S3, and the light emission control signal EM are each a scan signal, where positive potentials of the scan signal alternate with negative potentials of the scan signal; and are each provided by a scan driving circuit at the bezel of the display panel. Illustratively, the first control signal S1, the second control signal S2, the third control signal S3, and the light emission control signal EM are provided by scan circuits in different groups.

Figure 5:
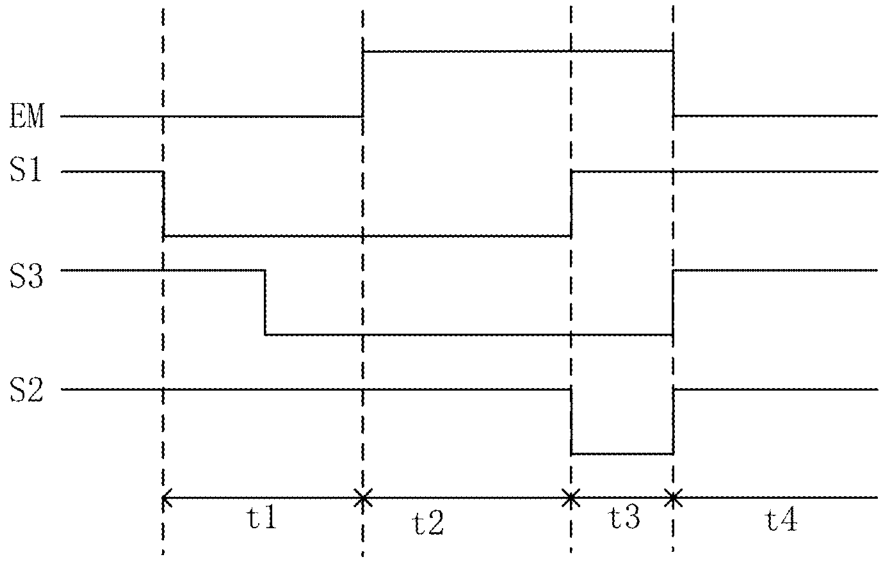
FIG. 5 is a drive timing diagram of another pixel circuit according to embodiments of the present application.

Referring to FIG. 4, the low-potential pulse of the first control signal S1 overlaps the low-potential pulse of the third control signal S3 in the reset phase t1 and the threshold compensation phase t2, the low-potential pulse of the second control signal S2 overlaps the low-potential pulse of the third control signal S3 in the data write phase t3, the low-potential pulse of the second control signal S2 does not overlap the low-potential pulse of the first control signal S1, and the duration of the high-potential pulse of the light emission control signal EM covers the threshold compensation phase t2 and the data write phase t3. Therefore, the pixel circuit can be normally driven as long as timing of multiple control signals satisfies the preceding features. The drive timing shown in FIG. 4 does not limit the present application. In other embodiments, as shown in FIG. 5, the pulse width of the third control signal S3 may be slightly shorter than the pulse width of the third control signal S3 shown in FIG. 4 as long as the low-potential pulse of the third control signal S3 still overlaps the low-potential pulse of the first control signal S1 in the reset phase t1. Illustratively, the pulse width of the third control signal S3 is the same as the pulse width of the first control signal S1. In this manner, the first control signal S1 and the third control signal S3 may be provided by scan circuits cascaded in the same group, thereby reducing the number of scan circuit groups for driving the pixel circuits, simplifying the structure of a scan driving circuit, and facilitating implementation of the narrow bezel of the display panel. For example, based on the feature of shifted output of scan circuits at multiple stages, a scan circuit for providing the first control signal S1 may be at a stage or several stages previous to a scan circuit for outputting the third control signal S3.

The following describes several possible structures of the pixel circuit.

Figure 6:
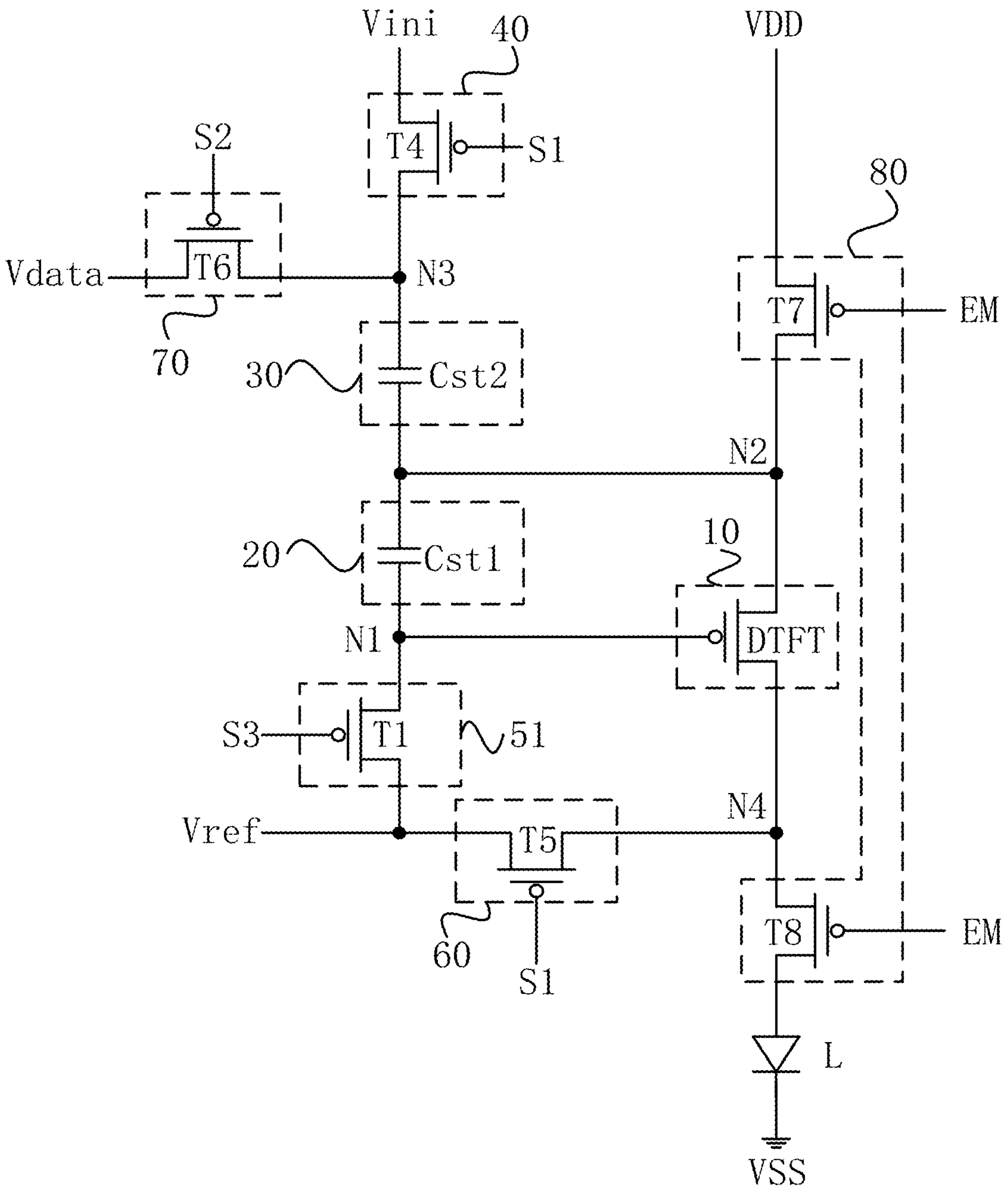
FIG. 6 is a diagram illustrating the structure of another pixel circuit according to embodiments of the present application.

FIG. 6 is a diagram illustrating the structure of another pixel circuit according to embodiments of the present application. Referring to FIG. 6, in an embodiment, for example, the drive module 10 includes a drive transistor DTFT. The control electrode of the drive transistor DTFT serves as the control terminal N1 of the drive module 10, the first electrode of the drive transistor DTFT serves as the first terminal N2 of the drive module 10, and the second electrode of the drive transistor DTFT serves as the second terminal N4 of the drive module 10. In this embodiment, the drive module 10 includes one transistor and the pixel circuit has a simple structure and is easy to implement.

Continuing referring to FIG. 6, in an embodiment, for example, the storage module 20 includes a first capacitor Cst1. The first terminal of the first capacitor Cst1 is electrically connected to the control terminal N1 of the drive module 10. The second terminal of the first capacitor Cst1 is electrically connected to the first terminal N2 of the drive module 10. The storage module 20 of this embodiment includes one capacitor and the pixel circuit has a simple structure and is easy to implement.

Continuing referring to FIG. 6, in an embodiment, for example, the coupling module 30 includes a second capacitor Cst2. The first terminal of the second capacitor Cst2 serves as the first terminal of the coupling module 30 and is electrically connected to the second terminal of the first capacitor Cst1. The second terminal of the second capacitor Cst2 serves as the second terminal N3 of the coupling module 30 and is electrically connected to the first reset module 40 and the data write module 70. The coupling module 30 of this embodiment includes one capacitor and the pixel circuit has a simple structure and is easy to implement.

Continuing referring to FIG. 6, in an embodiment, for example, the first reset module 40 includes a fourth transistor T4. The control electrode of the fourth transistor T4 is configured to receive a first control signal S1. The first electrode of the fourth transistor T4 is configured to receive a first reset signal Vini. The second electrode of the fourth transistor T4 is electrically connected to the second terminal N3 of the coupling module 30. In this embodiment, the first reset module 40 includes one transistor and the pixel circuit has a simple structure and is easy to implement.

Continuing referring to FIG. 6, in an embodiment, for example, when the second reset module includes a first reset unit 51, the first reset unit 51 includes a first transistor T1. The control electrode of the first transistor T1 is configured to receive a third control signal S3. The first electrode of the first transistor T1 is configured to receive a second reset signal Vref. The second electrode of the first transistor T1 is electrically connected to the control terminal N1 of the drive module 10. In this embodiment, the first reset unit 51 includes one transistor and the pixel circuit has a simple structure and is easy to implement.

Continuing referring to FIG. 6, in an embodiment, for example, the discharge module 60 includes a fifth transistor T5. The control electrode of the fifth transistor T5 is configured to receive a first control signal S1. The first electrode of the fifth transistor T5 is configured to receive a second reset signal Vref. The second electrode of the fifth transistor T5 is electrically connected to the second terminal N4 of the drive module 10. In this embodiment, the discharge module 60 includes one transistor and the pixel circuit has a simple structure and is easy to implement.

Continuing referring to FIG. 6, in an embodiment, for example, the data write module 70 includes a sixth transistor T6. The control electrode of the sixth transistor T6 is configured to receive a second control signal S2. The first electrode of the sixth transistor T6 is configured to receive the data voltage Vdata. The second electrode of the sixth transistor T6 is electrically connected to the second terminal N3 of the coupling module 30. In this embodiment, the data write module 70 includes one transistor and the pixel circuit has a simple structure and is easy to implement.

Continuing referring to FIG. 6, in an embodiment, for example, the light emission control module 80 includes a seventh transistor T7 and an eighth transistor T8. The control electrode of the seventh transistor T7 and the control electrode of the eighth transistor T8 are each configured to receive a light emission control signal EM. The first electrode of the seventh transistor T7 is connected to the first power supply. The second electrode of the seventh transistor T7 is electrically connected to the first electrode of the drive transistor DTFT. The first electrode of the eighth transistor T8 is electrically connected to the second electrode of the drive transistor DTFT. The second electrode of the eighth transistor T8 is electrically connected to the first electrode of the light-emitting element L. In this embodiment, the light emission control module 80 includes two transistors and the pixel circuit has a simple structure and is easy to implement.

In conclusion, this embodiment of the present application provides a 7T2C pixel circuit. Illustratively, the multiple transistors in the pixel circuit are each a p-type transistor prepared by using an LTPS technique, thereby reducing the preparation cost of the display panel.

Referring to FIGS. 4 and 6, the following describes the driving process of the pixel circuit.

In the reset phase t1, the first control signal S1, the third control signal S3, and the light emission control signal EM are each at a low potential, and the second control signal S2 is at a high potential; the first transistor T1, the fourth transistor T4, the fifth transistor T5, the seventh transistor T7, and the eighth transistor T8 are all on; the first reset signal Vini is transmitted to the second terminal of the second capacitor Cst2 (that is, the second terminal N3 of the coupling module 30) after passing through the fourth transistor T4; the second reset signal Vref is transmitted to the control electrode of the drive transistor DTFT (that is, the control terminal N1 of the drive module 10) after passing through the first transistor T1; meanwhile, the second reset signal Vref is transmitted to the second electrode of the drive transistor DTFT (that is, the second terminal N4 of the drive module 10) after passing through the fifth transistor T5 and then transmitted to the first electrode of the light-emitting element L after passing through the eighth transistor T8; and the first power signal VDD is transmitted to the first electrode of the drive transistor DTFT (that is, the first terminal N2 of the drive module 10) after passing through the seventh transistor T7. In this phase, the first capacitor Cst1 and the second capacitor Cst2 are discharged and reset, and the first electrode of the light-emitting element L is also reset.

In the threshold compensation phase t2, the first control signal S1 and the third control signal S3 are each at a low potential, and the second control signal S2 and the light emission control signal EM are each at a high potential; the seventh transistor T7 and the eighth transistor T8 are off, and the first transistor T1, the fourth transistor T4, and the fifth transistor T5 are on; the first reset signal Vini is transmitted to the second terminal N3 of the coupling module 30 after passing through the fourth transistor T4, making stable the potential at the second terminal N3 of the coupling module 30; the second reset signal Vref is transmitted to the control terminal N1 of the drive module 10 after passing through the first transistor T1, making stable the potential at the control terminal N1 of the drive module 10; the first terminal N2 of the drive module 10 is discharged through the drive transistor DTFT and the fifth transistor T5 until the drive transistor DTFT is turned off when the potential at the first terminal N2 of the drive module 10 decreases from the potential value of the first power signal VDD to Vref−Vth1; and the first capacitor Cst1 stores the voltage drop of the threshold voltage Vth1 of the drive transistor DTFT.

In the data write phase t3, the second control signal S2 and the third control signal S3 are each at a low potential, and the first control signal S1 and the light emission control signal EM are each at a high potential; the fourth transistor T4 and the fifth transistor T5 are off, the sixth transistor T6 is on, and the first transistor T1 is on; the second reset signal Vref is transmitted to the control terminal N1 of the drive module 10 after passing through the first transistor T1, making stable the potential at the control terminal N1 of the drive module 10; the data voltage Vdata is written to the second terminal N3 of the coupling module 30 after passing through the sixth transistor T6 and the potential at the second terminal N3 of the coupling module 30 jumps from the first reset signal Vini to the data voltage Vdata; and based on the coupling action of the capacitor, the second capacitor Cst2 transmits the potential variation at the second terminal of the second capacitor Cst2 to the first terminal the second capacitor Cst2 and the potential jump at the first terminal N2 of the drive module 10 is Vref−Vth1+(Vdata−Vini)*(Cst2)/(Cst1+Cst2+Cgs), where Cgs denotes the capacitance between the control electrode of the drive transistor DTFT and the first electrode of the drive transistor DTFT; therefore, the voltage difference variation at the two terminals of the first capacitor Cst1 is Vth1−(Vdata−Vini)*(Cst2)/(Cst1+Cst2+Cgs).

In the light emission phase t4, the light emission control signal EM is at a low potential, and the first control signal S1, the second control signal S2, and the third control signal S3 are each at a high potential; the first transistor T1 and the sixth transistor T6 are off, the seventh transistor T7 and the eighth transistor T8 are on, and the drive transistor DTFT generates a drive current to light the light-emitting element L; the drive current is a function of Vgs−Vth1, where Vgs is equal to the voltage difference between the two terminals of the first capacitor Cst1; and when the structure of the pixel circuit is determined, the first capacitor Cst1, the second capacitor Cst2, and Cgs are also determined as fixed values; therefore, the drive current is a function of Vdata−Vini, that is, the magnitude of drive current is independent of the threshold voltage Vth1 of drive transistor DTFT, that is, threshold compensation is implemented.

In conclusion, this embodiment of the present application provides a 7T2C pixel circuit that separates the threshold compensation process from the data write process and combines advantages such as high mobility, strong drive capability, and technical maturity of the LTPS transistor, ensuring more uniform brightness, high resolution, and high refresh rate of the display panel.

Figure 7:
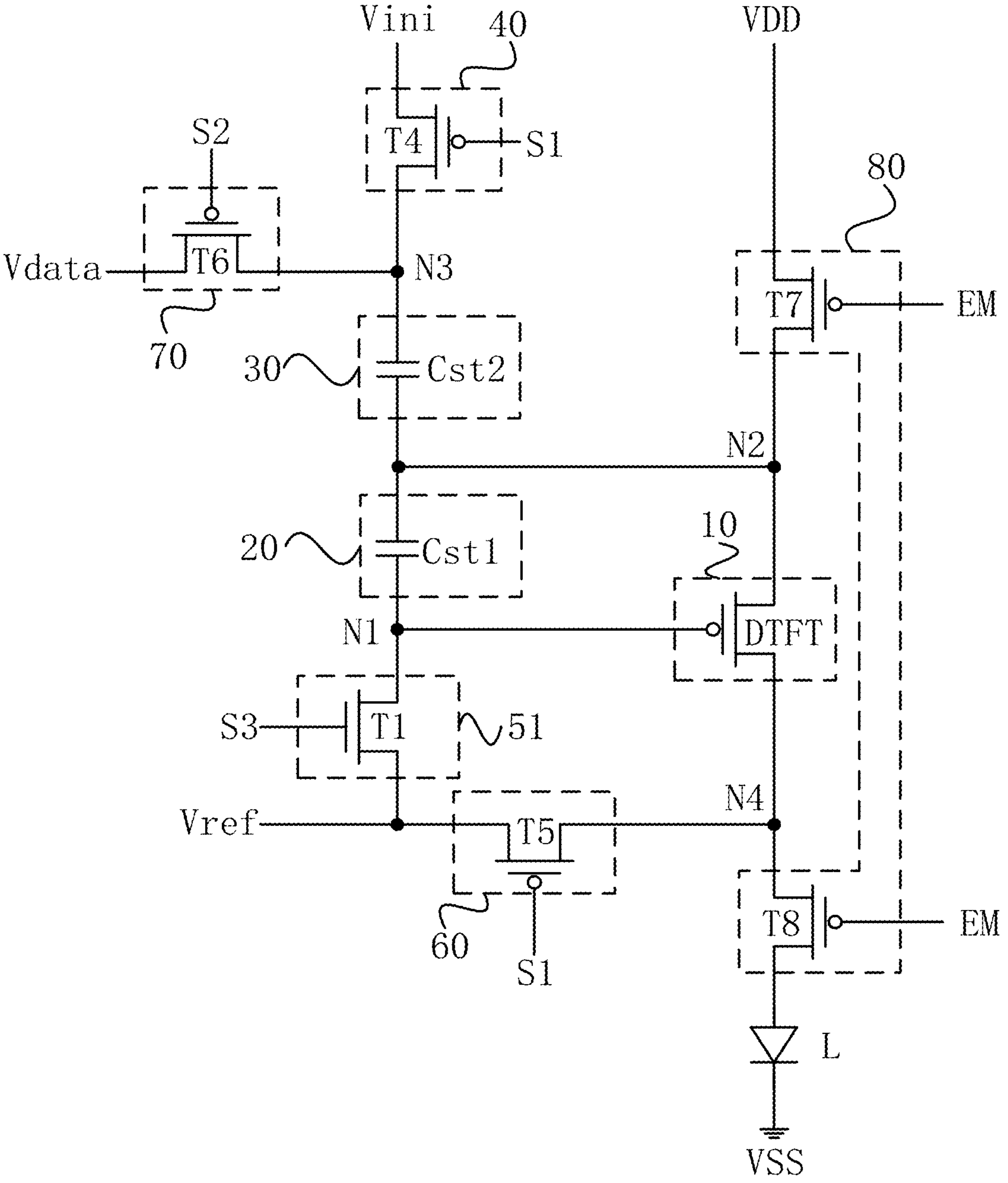
FIG. 7 is a diagram illustrating the structure of another pixel circuit according to embodiments of the present application.
Figure 8:
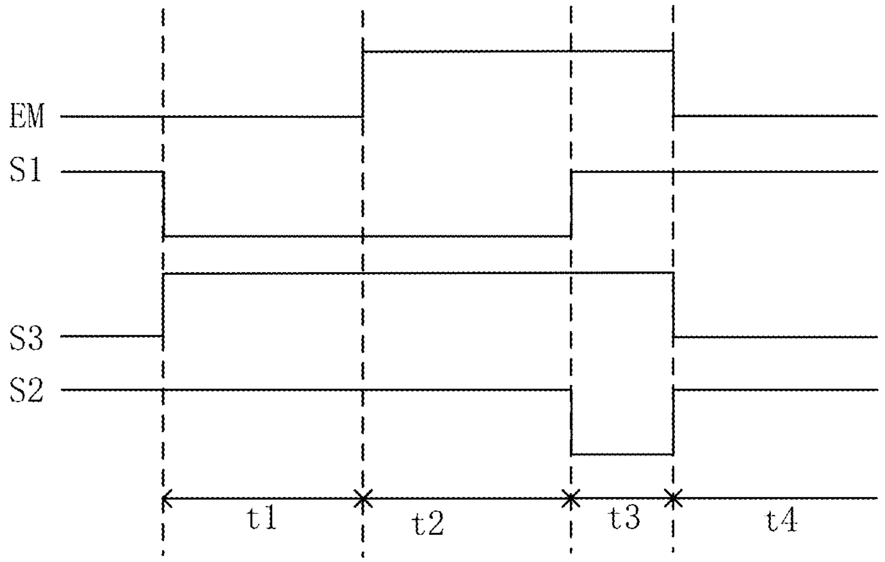
FIG. 8 is a drive timing diagram of another pixel circuit according to embodiments of the present application.

In the previous embodiments, the multiple transistors in the pixel circuit are each a p-type transistor, not limiting the present application. In other embodiments, some or all of the transistors may be replaced with n-type transistors according to the requirements, and accordingly, the potential of the control signal received by each transistor may be adjusted. The following describes several adjustment manners:

FIG. 7 is a diagram illustrating the structure of another pixel circuit according to embodiments of the present application. Referring to FIG. 7, in an embodiment, for example, compared with the pixel circuit of FIG. 6, the first transistor T1 may be replaced with an n-type transistor, for example, an indium gallium zinc oxide (IGZO) transistor. In this manner, based on the feature of low leakage current of the n-type transistor, the leakage current of the control electrode of the drive transistor DTFT can be reduced and the potential at the control electrode of the drive transistor DTFT can be maintained for a long time and the pixel circuit supports the function of low refresh, facilitating implementation wide-band drive of the display panel. For drive timing of the pixel circuit shown in FIG. 7, see FIG. 8. It can be seen from the comparison between FIG. 8 and FIG. 4 that the pulse of the third control signal S3 is reversed after the first transistor T1 is replaced with an n-type transistor.

Figure 9:
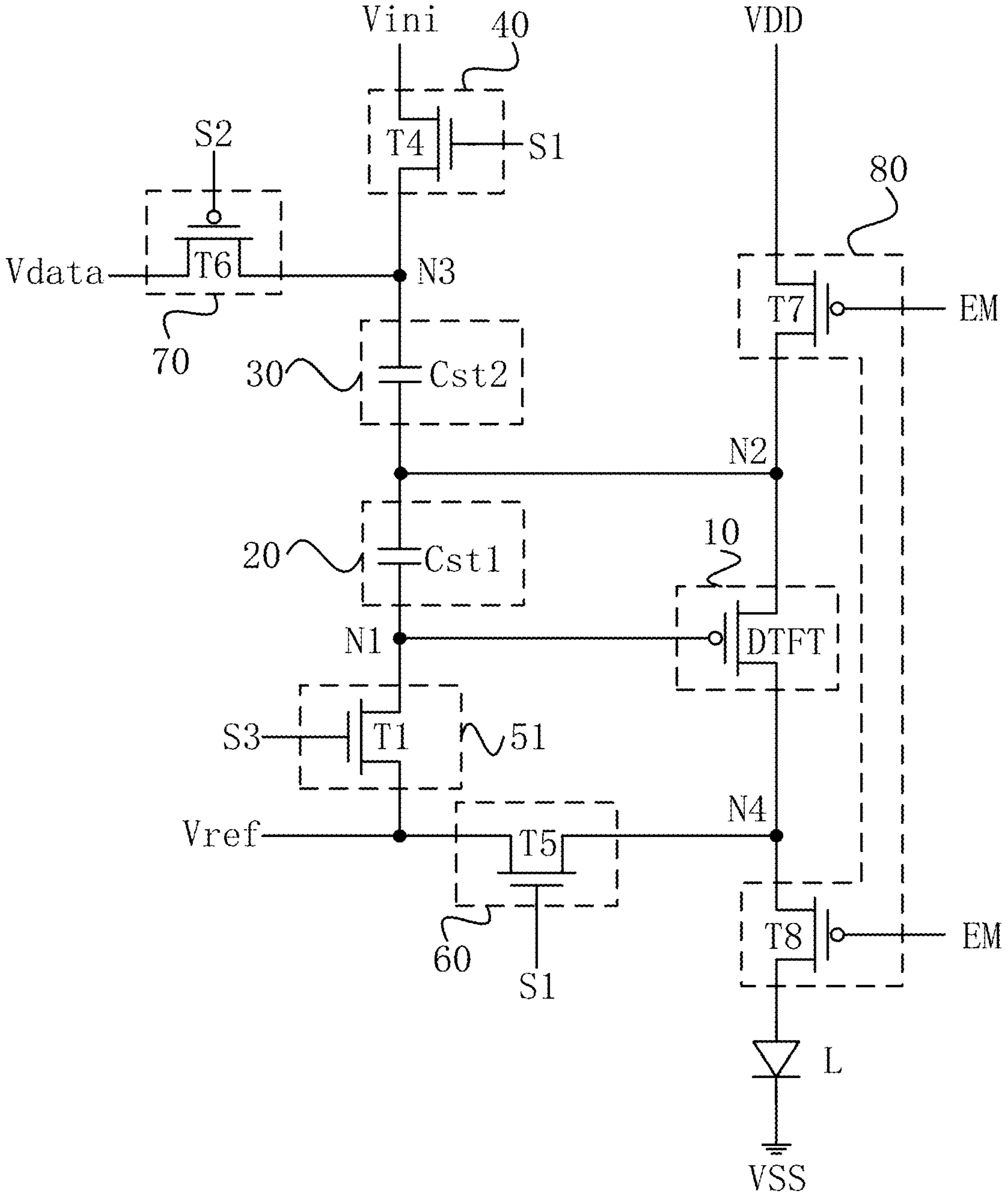
FIG. 9 is a diagram illustrating the structure of another pixel circuit according to embodiments of the present application.
Figure 10:
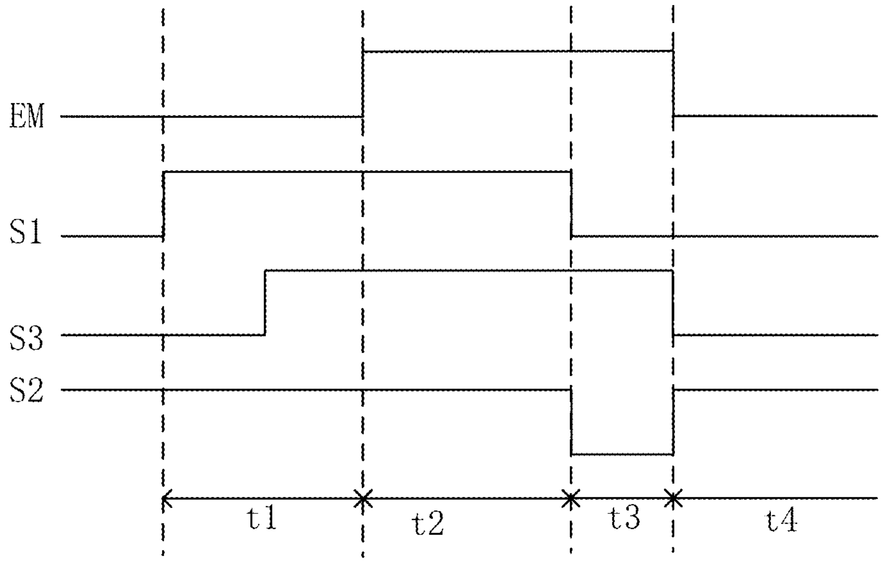
FIG. 10 is a drive timing diagram of another pixel circuit according to embodiments of the present application.

FIG. 9 is a diagram illustrating the structure of another pixel circuit according to embodiments of the present application. Referring to FIG. 9, based on FIG. 7, for example, the fourth transistor T4 and the fifth transistor T5 may also be replaced with n-type transistors. For drive timing of the pixel circuit shown in FIG. 9, see FIG. 10. It can be seen from the comparison between FIG. 10 and FIG. 5 that the pulse of the first control signal S1 and the pulse of the third control signal S3 are reversed after the first transistor T1, the fourth transistor T4, and the fifth transistor T5 are each replaced with an n-type transistor. In this case, the first control signal S1 and the third control signal S3 can still be provided by scan circuits cascaded in the same group, facilitating implementation of the narrow bezel of the display panel.

Figure 11:
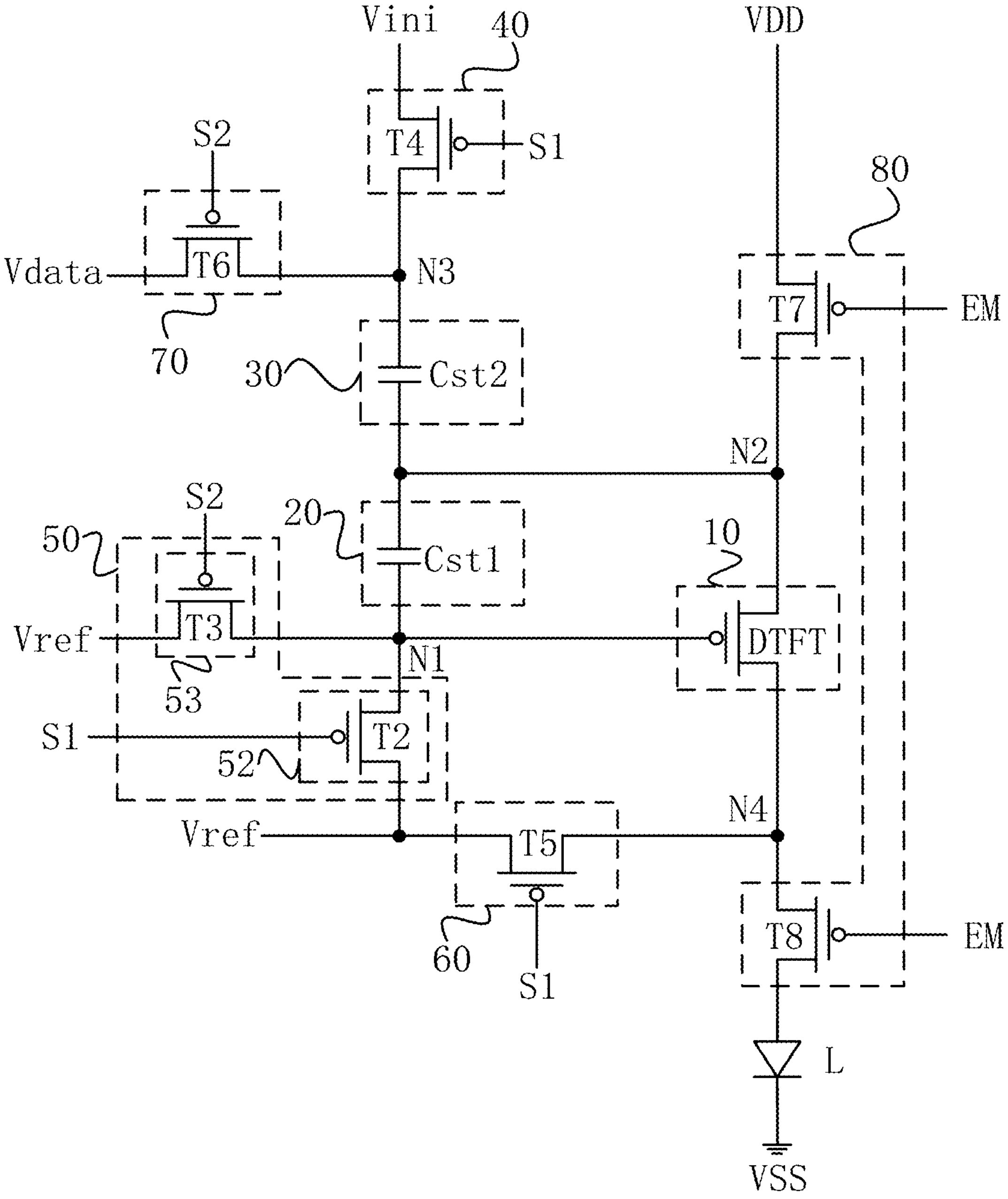
FIG. 11 is a diagram illustrating the structure of another pixel circuit according to embodiments of the present application.

The previous embodiments illustratively provide a structure of the second reset module, not limiting the present application. In other embodiments, as shown in FIG. 11, the second reset module may also include a second reset unit and a data write auxiliary unit. Detailed explanation is given below.

Referring to FIG. 11, in an embodiment, for example, the second reset module 50 includes a second reset unit 52 and a data write auxiliary unit 53. The second reset unit 52 is electrically connected to the control terminal N1 of the drive module 10 and configured to, in response to the first control signal S1, be turned in the reset phase and the threshold compensation phase to transmit the second reset signal Vref to the control terminal N1 of the drive module 10. The data write auxiliary unit 53 is electrically connected to the control terminal N1 of the drive module 10 and configured to, in response to the second control signal S2, be turned in the data write phase to transmit the second reset signal Vref to the control terminal N1 of the drive module 10. This makes the pixel circuit no longer need the third control signal and one group of control signal lines in the display panel can be reduced, simplifying the structure of the display panel.

It can be seen from the pixel circuit in FIG. 11 and the drive timing in FIG. 12, the pulse duration of the first control signal S1 does not overlap the pulse duration of the second control signal S2. In this embodiment, the second reset unit 52 and the data write auxiliary unit 53 act in different durations. Under the control of the second control signal S2, the second reset unit 52, the first reset module 40, and the discharge module 60 act in the reset phase t1 and the threshold compensation phase t2. Under the control of the second control signal S2, the data write auxiliary unit 53 and the data write module 70 act in the data write phase t3. In this manner, the threshold compensation process and the data write process of the pixel circuit are completely separated from each other in terms of duration and control signal. It is not required to implement threshold compensation through an overlap between low-potential pulses of two control signals (the first control signal and the third control signal). It is not required to implement data write through an overlap between low-potential pulses of two control signals (the second control signal and the third control signal). It is not required to use cascaded scan circuits to provide control signals for the same pixel circuit. It is required to drive the pixel circuit by the first control signal S1, the second control signal S2, and the light emission control signal EM that are independent of each other. For the same row of pixel circuit, the structure and the drive timing of the pixel circuit are configured and the threshold compensation phase t2 and the data write phase t3 are performed one after another without interfering with each other. For different rows of pixel circuits, the scan circuit for providing the second control signal S2 for controlling implementation of the data write stage and the scan circuit for providing the first control signal S1 for controlling implementation of the threshold compensation stage are independent of each other. There is no cascading relationship or other correlation or control relationship between the two types of scan circuits. The signal generation processes of the two types of scan circuits do not affect each other. Therefore, different rows of pixel circuits do not limit each other in terms of the threshold compensation phase t2 and the data write phase t3 due to correlation between the control signals. This simplifies the control logic of the display panel and facilitates a high refresh rate of the display panel.

Continuing referring to FIG. 11, based on the previous embodiments, for example, the second reset unit 52 includes a second transistor T2, where the control electrode of the second transistor T2 is configured to receive the first control signal S1, the first electrode of the second transistor T2 is configured to receive the second reset signal Vref, and the second electrode of the second transistor T2 is electrically connected to the control terminal N1 of the drive module 10; and the data write auxiliary unit 53 includes a third transistor T3, where the control electrode of the third transistor T3 is configured to receive the second control signal S2, the first electrode of the third transistor T3 is configured to receive the second reset signal Vref, and the second electrode of the third transistor T3 is electrically connected to the control terminal N1 of the drive module 10. In this embodiment, the second reset unit 52 and the data write auxiliary unit 53 each include one transistor and the pixel circuit has a simple structure and is easy to implement.

FIG. 11 provides an 8T2C pixel circuit in which the multiple transistors are each a p-type transistor, not limiting the present application. In other embodiments, for example, some or all of the transistors may be replaced with n-type transistors. For example, to reduce current leakage at the control electrode of the drive transistor DTFT, the second transistor T2 and the third transistor T3 are each replaced with an n-type transistor. Based on this, in order not to increase the number of control signals, the fourth transistor T4, the fifth transistor T5, and the sixth transistor T6 may also be replaced with n-type transistors.

Based on the previous embodiments, for example, the duration of the threshold compensation phase t2 may be set more than one row duration or even hundreds of row durations, prolonging the threshold compensation duration and ensuring the threshold compensation effect.

Based on the previous embodiments, for example, the first power signal VDD may also serve as the first reset signal Vini, reducing the number of signal lines in the display panel, simplifying the structure of the display panel, and facilitating the cabling design of the display panel.

It is to be noted that in the previous embodiments, the first electrode of each transistor may be referred to as a source or a drain, and the second electrode of each transistor may be referred to as a drain or a source. Since the structure of each transistor is symmetrical, the source and the drain here are not differentiated from each other.

Embodiments of the present application also provide a display panel. The display panel includes the pixel circuit of any embodiment of the present application and has corresponding beneficial effects. The details are not described again.

Embodiments of the present application also provide a method of driving a pixel circuit. The method is applicable to the pixel circuit of any embodiment of the present application and has corresponding beneficial effects. FIG. 13 is a flowchart of a method of driving a pixel circuit according to embodiments of the present application. Referring to FIG. 13, the method includes S110, S120, S130, and S140.

In S110, in a reset phase, the first reset module is controlled to transmit the first reset signal to the second terminal of the coupling module, the second reset module is controlled to transmit the second reset signal to the control terminal of the drive module, the discharge module is controlled to transmit the second reset signal to the second terminal of the drive module, and the light emission control module is controlled to transmit a first power signal provided by the first power supply to the first terminal of the drive module and transmit the second reset signal to a first electrode of the light-emitting element.

In S120, in the threshold compensation phase, the first reset module is controlled to transmit the first reset signal to the second terminal of the coupling module; the second reset module is controlled to transmit the second reset signal to the control terminal of the drive module; and the discharge module is controlled to turn on to make the first terminal of the drive module discharge through the drive module and the discharge module to make the storage module store the threshold voltage of the drive module until the drive module is turned off when a potential difference between the control terminal of the drive module and the first terminal of the drive module is equal to the threshold voltage of the drive module.

In S130, in the data write phase, the second reset module is controlled to transmit the second reset signal to the control terminal of the drive module, the data write module is controlled to write the data voltage to the second terminal of the coupling module, and the coupling module is controlled to couple the potential variation at the second terminal of the coupling module to the first terminal of the coupling module.

In S140, in a light emission phase, the light emission control module is controlled to turn on, the drive module is controlled to generate a drive current based on a voltage at the control terminal of the drive module and a voltage at the first terminal of the drive module, and the drive current is transmitted to the light-emitting element.

The method of this embodiment of the present application separates the threshold compensation phase from the data write phase, ensuring more uniform brightness, high resolution, and high refresh rate of the display panel.

It is to be noted that in multiple pixel circuit embodiments, methods are described for different pixel circuits. These methods can all be considered as the methods of the pixel circuits of embodiments of the present application. Repeated content is not described here.

It is to be understood that various forms of processes shown above may be adopted with steps reordered, added or deleted. For example, the steps described in the present application may be performed in parallel, sequentially or in different sequences, as long as the desired results of the embodiments of the present application can be achieved, and no limitation is imposed herein.

What is claimed is:

1. A pixel circuit, comprising:

a drive module;

a storage module electrically connected to a control terminal of the drive module and a first terminal of the drive module and configured to store a potential difference between the control terminal of the drive module and the first terminal of the drive module;

a coupling module, a first terminal of the coupling module electrically connected to the first terminal of the drive module, and the coupling module configured to couple a potential variation at a second terminal of the coupling module to the first terminal of the coupling module;

a first reset module electrically connected to the second terminal of the coupling module and configured to transmit a first reset signal to the second terminal of the coupling module to reset the second terminal of the coupling module before a data write phase;

a second reset module electrically connected to the control terminal of the drive module and configured to transmit a second reset signal to the control terminal of the drive module in at least a threshold compensation phase and the data write phase;

a discharge module electrically connected to a second terminal of the drive module is configured to be turned on in the threshold compensation phase, the first terminal of the drive module discharges through the drive module and the discharge module to store a threshold voltage of the drive module in the storage module;

a data write module electrically connected to the second terminal of the coupling module and configured to receive a data voltage; and a light emission control module connected to the drive module and a light-emitting element between a first power supply and a second power supply, wherein a control terminal of the first reset module is configured to receive a first control signal, and the first reset module is configured to, in response to the first control signal, be turned on in a reset phase and the threshold compensation phase to transmit the first reset signal to the second terminal of the coupling module;

a control terminal of the discharge module is configured to receive the first control signal, and the discharge module is configured to, in response to the first control signal, be turned on in the reset phase to transmit the second reset signal to the second terminal of the drive module and be turned on in the threshold compensation phase to make the first terminal of the drive module discharge through the drive module and the discharge module;

a control terminal of the data write module is configured to receive a second control signal, and the data write module is configured to, in response to the second control signal, be turned on in the data write phase to write the data voltage to the second terminal of the coupling module; and a control terminal of the light emission control module is configured to receive a light emission control signal, and the light emission control module is configured to, in response to the light emission control signal, be turned on in the reset phase and a light emission phase, wherein the second reset module comprises:

a second reset unit electrically connected to the control terminal of the drive module and configured to, in response to the first control signal, be turned on in the reset phase and the threshold compensation phase to transmit the second reset signal to the control terminal of the drive module; and a data write auxiliary unit electrically connected to the control terminal of the drive module and configured to, in response to the second control signal, be turned on in the data write phase to transmit the second reset signal to the control terminal of the drive module.

2. The pixel circuit of claim 1, wherein the storage module comprises a first capacitor, wherein a first terminal of the first capacitor is electrically connected to the control terminal of the drive module, and a second terminal of the first capacitor is electrically connected to the first terminal of the drive module; and the coupling module comprises a second capacitor, wherein a first terminal of the second capacitor serves as the first terminal of the coupling module, and a second terminal of the second capacitor serves as the second terminal of the coupling module.

3. The pixel circuit of claim 1, wherein the second reset unit comprises a second transistor, wherein a control electrode of the second transistor is configured to receive the first control signal, a first electrode of the second transistor is configured to receive the second reset signal, and a second electrode of the second transistor is electrically connected to the control terminal of the drive module; and the data write auxiliary unit comprises a third transistor, wherein a control electrode of the third transistor is configured to receive the second control signal, a first electrode of the third transistor is configured to receive the second reset signal, and a second electrode of the third transistor is electrically connected to the control terminal of the drive module.

4. The pixel circuit of claim 1, wherein the drive module comprises a drive transistor, wherein a control electrode of the drive transistor serves as the control terminal of the drive module, a first electrode of the drive transistor serves as the first terminal of the drive module, and a second electrode of the drive transistor serves as the second terminal of the drive module; the first reset module comprises a fourth transistor, wherein a control electrode of the fourth transistor is configured to receive a first control signal, a first electrode of the fourth transistor is configured to receive the first reset signal, and a second electrode of the fourth transistor is electrically connected to the second terminal of the coupling module;

the discharge module comprises a fifth transistor, wherein a control electrode of the fifth transistor is configured to receive the first control signal, a first electrode of the fifth transistor is configured to receive the second reset signal, and a second electrode of the fifth transistor is electrically connected to the second terminal of the drive module;

the data write module comprises a sixth transistor, wherein a control electrode of the sixth transistor is configured to receive a second control signal, a first electrode of the sixth transistor is configured to receive the data voltage, and a second electrode of the sixth transistor is electrically connected to the second terminal of the coupling module; and the light emission control module comprises a seventh transistor and an eighth transistor, wherein a control electrode of the seventh transistor and a control electrode of the eighth transistor are each configured to receive a light emission control signal, a first electrode of the seventh transistor is connected to the first power supply, a second electrode of the seventh transistor is electrically connected to the first electrode of the drive transistor, a first electrode of the eighth transistor is electrically connected to the second electrode of the drive transistor, and a second electrode of the eighth transistor is electrically connected to a first electrode of the light-emitting element.

5. The pixel circuit of claim 4, wherein a threshold voltage of the drive transistor serves as the threshold voltage of the drive module.

6. The pixel circuit of claim 1, wherein the first reset signal and the second reset signal are each a direct-current voltage signal.

7. The pixel circuit of claim 1, wherein a first power signal generated by the first power supply also serves as the first reset signal.

8. A method of driving a pixel circuit, configured to drive a pixel circuit, wherein the pixel circuit comprises:

a drive module;

a storage module electrically connected to a control terminal of the drive module and a first terminal of the drive module;

a coupling module, wherein a first terminal of the coupling module is electrically connected to the first terminal of the drive module;

a first reset module electrically connected to a second terminal of the coupling module;

a second reset module electrically connected to the control terminal of the drive module;

a discharge module electrically connected to a second terminal of the drive module;

a data write module electrically connected to the second terminal of the coupling module; and a light emission control module connected to the drive module and a light-emitting element between a first power supply and a second power supply;

wherein the method of driving the pixel circuit comprises:

in a reset phase, controlling the first reset module to transmit the first reset signal to the second terminal of the coupling module; controlling the second reset module to transmit the second reset signal to the control terminal of the drive module; controlling the discharge module to transmit the second reset signal to the second terminal of the drive module; and controlling the light emission control module to transmit a first power signal provided by the first power supply to the first terminal of the drive module and transmit the second reset signal to a first electrode of the light-emitting element;

in a threshold compensation phase, controlling the first reset module to transmit the first reset signal to the second terminal of the coupling module; controlling the second reset module to transmit the second reset signal to the control terminal of the drive module; and controlling the discharge module to turn on to make the first terminal of the drive module discharge through the drive module and the discharge module to make the storage module store a threshold voltage of the drive module until the drive module is turned off when a potential difference between the control terminal of the drive module and the first terminal of the drive module is equal to the threshold voltage of the drive module;

in the data write phase, controlling the second reset module to transmit the second reset signal to the control terminal of the drive module; controlling the data write module to write a data voltage to the second terminal of the coupling module; and controlling the coupling module to couple a potential variation at the second terminal of the coupling module to the first terminal of the coupling module; and in a light emission phase, controlling the light emission control module to turn on, making the drive module generate a drive current based on a voltage at the control terminal of the drive module and a voltage at the first terminal of the drive module, and transmitting the drive current to the light-emitting element.

9. The method of claim 8, wherein in the threshold compensation phase, a potential at the control terminal of the drive module, maintained by the second reset signal, maintains a potential at the first terminal of the drive module after discharging a potential corresponding to the threshold voltage and stores the threshold voltage in the storage module; and a potential at the second terminal of the coupling module, maintained by the first reset signal in the threshold compensation phase and written by the data voltage in the data write phase, couples the first terminal of the coupling module to a potential related to the data voltage and stores a voltage related to both the threshold voltage and the data voltage in the storage module.

* * * * *